Oct. 8, 1935.                M. PEDERSEN                2,016,650
                            CIGAR ENVELOPING
                         Filed June 5, 1930         2 Sheets-Sheet 1
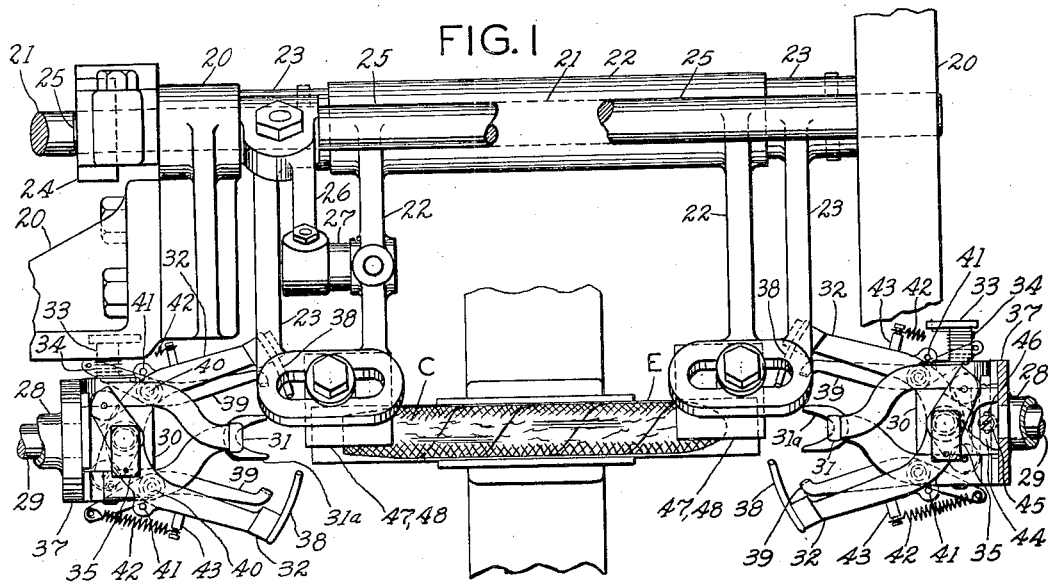
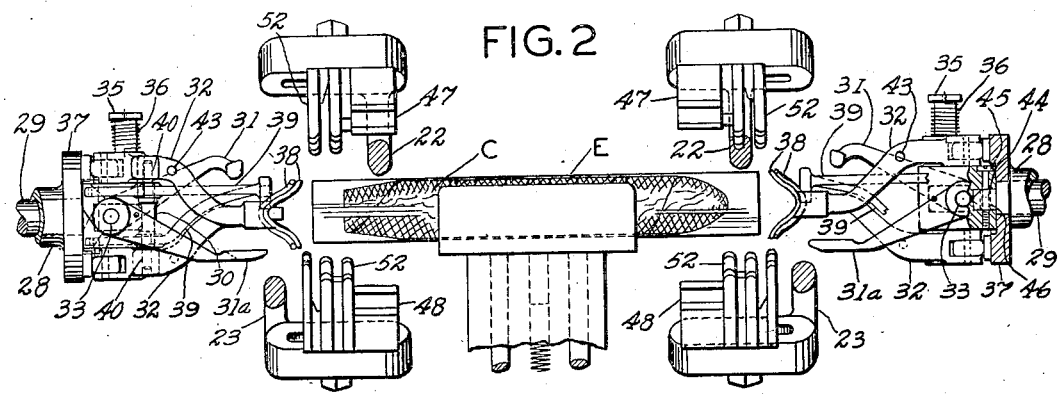
   
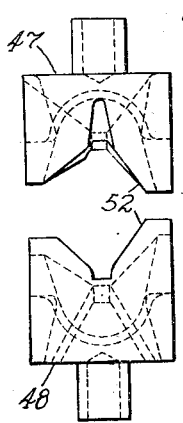 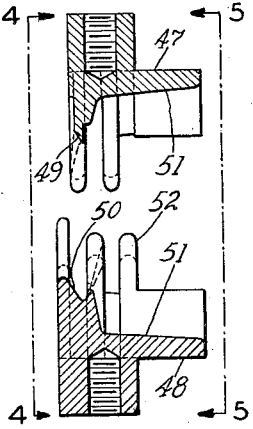 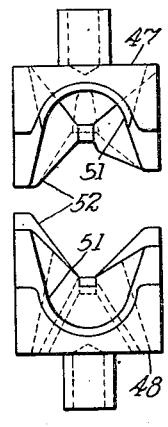 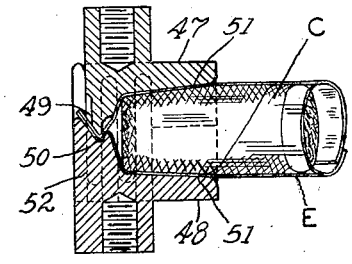

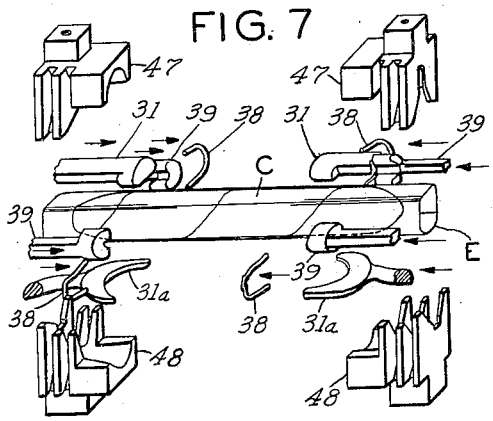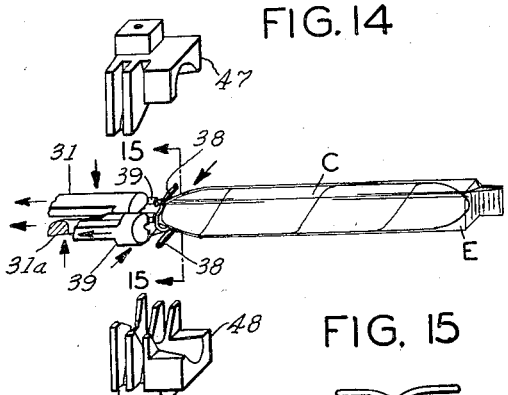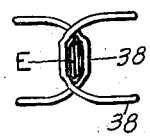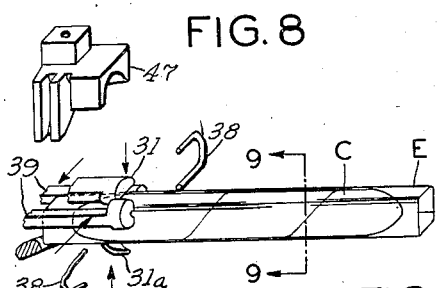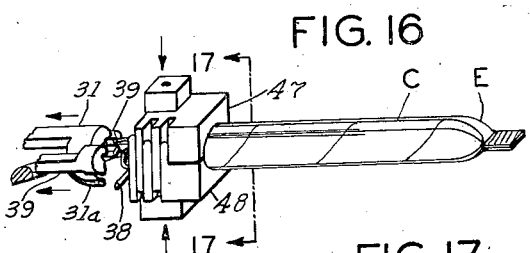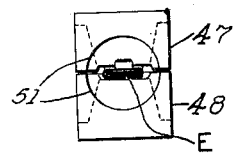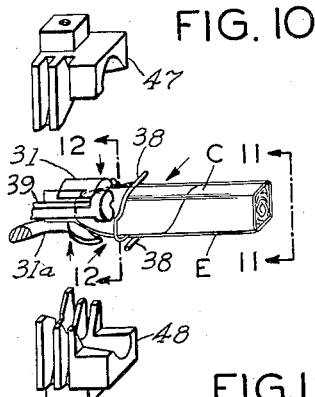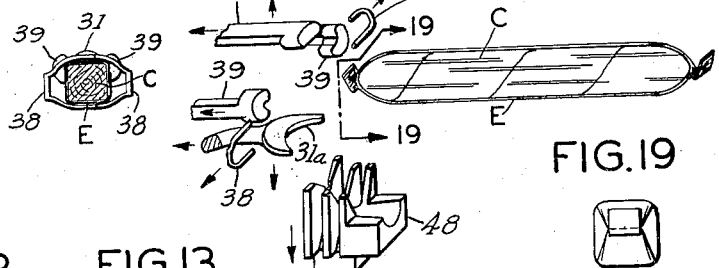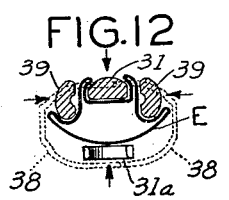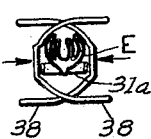

Patented Oct. 8, 1935

2,016,650

UNITED STATES PATENT OFFICE 2,016,650

CIGAR ENVELOPING

Mathias Pedersen, Brooklyn, N. Y., assignor to International Cigar Machinery Company, a corporation of New Jersey Application June 5, 1930, Serial No. 459,392

6 Claims. (Cl. 93—2)

This invention relates to an improvement in cigar enveloping, its main object being to produce a novel method of enveloping cigars and other articles and to adapt a cigar foiling machine such as is described in a prior application of H. H. Wheeler, Cigar enveloping machine, Serial No. 203,082, filed July 2, 1927, for carrying out the novel method in applying a cellophane or other similar enveloping material to cigars or other articles fed continuously to the intermittently revolving turret of such a machine. A further object is the production of a novel cigar envelope. With these and other objects not specifically mentioned in view, the invention consists of certain constructions and combinations which will be hereinafter fully described and then specifically set forth in the claims hereunto appended.

Since tin foil is soft and pliable, while cellophane is stiff and does not hold a crease readily, the end-folding means of an ordinary foiling machine will not produce a permanent fold when used on cellophane envelopes, and it becomes necessary to employ end folders of a different character.

In the present invention, the end folding is achieved by first tucking and crimping the overhanging ends of the cellophane envelope by means of spring-actuated tuck and crimper fingers, and then folding and creasing the ends so crimped by means of folding dies arranged to close on the ends of the cigar package.

The tuck and crimper fingers are mounted on a block actuated back and forth axially of the cigar at each end of the package by a cam connected to the block and timed to reciprocate the block over the ends of the package at the proper moment. The folding dies are mounted on the pivoted arms formerly employed to operate the two parts of the preformer described in the Wheeler machine referred to above, and are actuated to close upon the ends of the cigar package by the same means as formerly used to open and close the aforesaid preformer.

In the accompanying drawings in which like characters of reference indicate the same or like parts:

Fig. 1 is a plan view of a portion of the foiling machine, showing a cigar package in end folding position and having the novel tucking, crimping and folding devices attached to its operating parts;

Fig. 2 is a side elevation of Fig. 1, these two figures showing the details of construction of the tucking and crimping devices;

Fig. 3 is a detail longitudinal section of the folding dies;

Figs. 4 and 5 are detail elevations of the folding dies taken on the lines 4—4 and 5—5 of Fig. 3, respectively;

Fig. 6 is a detail longitudinal section of the folding dies in closed position on the end of a cigar and its wrapper; and Figs. 7–19 are diagrammatic views showing the successive stages in the operation of the tucking and crimping fingers and of the folding dies.

In carrying the invention into effect, there is provided a method of, and apparatus for, enveloping a cigar to produce applicant's cigar envelope. In the best practice of the invention, the ends of the cigar envelope are sealed in two stages, the ends of the envelope being first closed and then provided with transversely creased folds. All the apparatus that is essential to the practice of the invention in its simplest form is a support for a cigar encircled by an envelope, means for closing the ends of the cigar envelope, including a set of co-acting folding fingers and a pair of crimper wires, and cooperating male and female dies constructed to produce a transversely creased fold on the ends of the cigar envelope.

Referring to Figs. 1 and 2 of the drawings, the frames 20 of the foiling machine carry the horizontal shaft 21 on which are mounted the loosely fitted swinging arms 22 and the fixedly attached arms 23. A rocking motion is imparted to the shaft 21 by a crank and lever, not shown, actuated by a cam, not shown. On the shaft 21 is also mounted a gear segment, not shown, in mesh with a gear segment 24 on the upper shaft 25 to which is attached the lever 26 connected by link 27 to one of the arms 22, so that the rocking motion of shaft 21 causes the simultaneous opening or closing of the arms 22 and 23 for a purpose hereinafter described.

In brackets supported by the frames 20 are slidably mounted two hollow shafts 28 in each of which is slidable a plunger 29. The shafts 28 and plunger 29 are in axial alignment with the cigar package when the latter is in the folding position of the turret, and have longitudinal back and forth motions imparted to them at the proper moment by suitable cams, such as shown in the patent to Neumair, No. 1,721,527, granted July 23, 1929, mounted on the turret shaft. On the inner ends of the plunger 29 are mounted the blocks 30 carrying the tuck fingers 31, 31a and the crimper fingers 32, the former being pivoted on a stud 33 in each block 30 and pressed inwardly towards the cigar package by coil springs 34 attached between the heads of the studs and the fingers, while the latter are pivoted on a stud 35 carried in each block, having the coil springs 36 mounted thereon for the same purpose. The fingers 31, 31a, and 32 are swung about their pivots into inoperative position by the engagement of the tail projections on their inner ends with the flanges 37 of the hollow shafts 28 which are moved relatively to the solid shafts 29 by the aforesaid actuating cams at the proper moment. At their outer ends, the fingers 32 carry the bent crimper wires 38 which, in the closed position of the fingers, surround the cigar envelope and close up over the ends of the cigar as they are drawn axially from their inner to their outer position by the simultaneous backward movement of shafts 28 and plungers 29 imparted by the aforesaid cams.

The tuck fingers 31, 31a engage the top and bottom of the wrapper end, while the crimper wires 38 engage their sides. The ends of the upper tuck fingers 31 are narrow and solid while those of the lower tuck fingers 31a are wide and forked, so as to fold the under side of the wrapper end upwards around the tuck produced by the upper finger. In order to positively fold the under part of the wrapper end around the tuck made by finger 31, inwardly curved side tucker fingers 39 are provided, the lower edges of which tuck the lower portions of the wrapper end sides, while their upper edges fold the upper portions of the same around the upper tuck fingers 31. The side tucker fingers 39 have a limited swing on pivots 40 inserted into the crimper fingers 32 and are held in tension against the stop-pins 41 fixed thereon by springs 42 anchored to pins 43 also fixed thereon. The action of these fingers 39 is thus controlled by the stop-pin 41 and the movement of the fingers on which they are mounted so that though spring pressed towards the cigar, they cannot move until the fingers 32 and the stop-pin 41 is also moved towards the cigar, the spring 42 permitting yielding pressure of the fingers 39 against the cigar. The blocks 30 are mounted on the projecting ends 44 of plungers 29, which are formed to readily enter the corresponding vertical slots in blocks 30, each of which carries a clamp-screw 45 passing through an elongated slot 46 in the projections 44, as clearly shown at the right hand end of Figs. 1 and 2. In this manner, a vertical adjustment of blocks 30 may be made to suit the folding fingers to the diameters of different size cigars.

To the swinging arms 22 and 23 are attached the folding dies 47 and 48, respectively, shown in detail in Figs. 3-6. The swinging of the arms 22 and 23 opens the dies 47 and 48 in the manner fully described in the above mentioned application, to which reference is made for a detailed description thereof. In Fig. 4, the male die 47 and female die 48 are shown in their separated position, and in Fig. 6 they are shown in their closed position. The upper or male die 47 has a pointed projection 49 fitting into a groove 50 of the lower or female die 48, so as to fold and crease the overhanging end of the wrapper when the conically bored axial ends 51 of the dies are closed upon the ends of the cigar. Each die has a number of spaced ribs 52 fitted into the spaces between those of the other die, so that, on coming together, the dies are properly guided in their operating position without injury to the envelope.

The successive stages of folding the ends of the envelope are shown in Figs. 7-19. When a cigar C with its envelope E has arrived at the folding station of the turret, the shafts 28 and 29 move inwardly toward the cigar, thereby bringing the tuck fingers 31, 31a, and the crimper fingers 32, which during the motion of the turret are held beyond the ends of the package, to a position adjacent the package ends, as shown by the arrows in Fig. 7. Next, the hollow shafts 28 are withdrawn and the tuck fingers 31 and 31a and the side fingers 39 are pressed towards the cigar until they come to rest on the package, as shown in Figs. 8 and 9, and then the crimper fingers 32 are closed until the wires 38 encircle the package, as shown in Figs. 10 and 11. The shafts 28 and plungers 29 thereupon move outwards simultaneously, dragging the tuckers 31, 31a and the crimper wires 38 over the ends of the package, thereby first folding the upper portions of the sides of the envelope around the upper tucker 31, as shown in Fig. 12, and then, as the outward motion of the fingers continues, folding the lower portions of the sides of the envelope over the previously made upper folds, as seen in Fig. 13. When the crimper wires 38 arrive at the ends of the cigar, Fig. 14, they come close together, thereby crimping the folded envelope end into the form of a vertical web, as shown in Fig. 15. After the crimper wires 38 have cleared the dies 47 and 48, the latter close upon the package ends, as shown in Fig. 16, thereby folding and creasing the crimped end folds horizontally as seen in Figs. 6 and 17. The dies then return to their stationary open position and the tuck and crimper fingers open up as shown in Fig. 18, leaving the package ends in their finished form, as shown in Fig. 19. In their positions shown in Fig. 18, the folding fingers and forming dies are clear of the turret and its overhanging package ends, and are ready to repeat their cycle of operations as soon as the next cigar package has entered the end folding station upon turning of the turret.

What is claimed is:

1. In a cigar enveloping machine, the combination with a support for a cigar encircled by an envelope, of means for closing the ends of the envelope into the form of a closed vertical web, and cooperating male and female folding dies arranged at each end of the support to engage the closed vertical web to flatten it out horizontally.

2. In a cigar enveloping machine, the combination with a support for a cigar encircled by an envelope, of means for closing the ends of the envelope, and cooperating male and female folding dies arranged at each end of the support to engage the closed ends of the envelope to form a transversely creased fold thereon, and said means including an upper tuck finger, a lower tuck finger, a pair of cooperating side tucker fingers, and a pair of cooperating crimper wires, a support for a set of said members being arranged at each end of the cigar support to carry them into position to engage the ends of the envelope and to move them longitudinally of the cigar to fold the upper portions of the sides of the envelope ends around the upper tuck finger, to fold the lower portions of the sides of the envelope ends over the previously made folds, and to crimp the folded envelope ends into the form of a closed vertical web.

3. In a cigar enveloping machine, the combination with a support for a cigar encircled by an envelope, of means for closing the ends of the envelope, and cooperating male and female folding dies arranged at each end of the support to engage the closed ends of the envelope to form a transversely creased fold thereon, said means including a set of spring pressed fingers arranged at each end of the support and adapted to engage the adjacent end of the envelope, and a cam operated reciprocating rod supporting said fingers to move them longitudinally of the cigar to close the ends of the envelope.

4. In a cigar enveloping machine, the combination with a support for a cigar encircled by an envelope, of means for closing the ends of the envelope, and cooperating male and female folding dies arranged at each end of the support to engage the closed ends of the envelope to form a transversely creased fold thereon, said means including a set of pivoted spring pressed fingers arranged at each end of the support and adapted to engage the adjacent end of the envelope, and a cam operated shaft adapted to move said fingers about their pivots into inoperative position.

5. In a cigar enveloping machine, the combination with a support for a cigar encircled by an envelope, of means for closing the ends of the envelope into the form of a closed vertical web, and cooperating male and female folding dies arranged at each end of the support to engage the closed ends of the envelope to form a transversely creased fold thereon, said dies being provided with interfitting ribs.

6. In a cigar enveloping machine, the combination with a support for a cigar encircled by an envelope, of means for closing the ends of the envelope into the form of a closed vertical web, and cooperating male and female folding dies arranged at each end of the support to engage the closed ends of the envelope to form a transversely creased fold thereon, said female dies being provided with a groove and said male dies being provided with a projection fitting into said groove when the dies are closed to fold and crease the ends of the envelope.

MATHIAS PEDERSEN.